Sept. 16, 1952          H. MANSEN          2,610,511

VALVE ACTUATOR

Filed June 27, 1945          2 SHEETS—SHEET 1

Inventor
Harry Mansen

By Andrew F. Wintercorn
Atty.

Sept. 16, 1952     H. MANSEN     2,610,511
VALVE ACTUATOR

Filed June 27, 1945     2 SHEETS—SHEET 2

Inventor
Harry Mansen

Patented Sept. 16, 1952

2,610,511

UNITED STATES PATENT OFFICE 2,610,511

VALVE ACTUATOR

Harry Mansen, Barrington, Ill., assignor to Elgin Softener Corporation, Elgin, Ill., a corporation of Illinois Application June 27, 1945, Serial No. 601,784

14 Claims. (Cl. 74—22)

1

This invention relates to valve actuators, and is more particularly concerned with actuators for multiport valves of the kind disclosed in McGill et al. Patent 2,398,437, issued April 16, 1946.

The principal object of my invention consists in the provision of improved valve operating means for multiport valves of the kind mentioned, in which the operating stem for turning the stem plate is adapted to be first moved endwise to attend to the closing of the shut-off valve and the opening of the pressure relief valve, and is then adapted to be turned to turn the stem plate from one position to another, after which the stem is adapted to be again moved endwise to return it to the retracted position, thereby reopening the shut-off valve and closing the pressure relief valve.

In accordance with my invention, the valve operating means has the operating stem threaded in the hub of a hand wheel to give endwise movement to the stem in either direction, and a radial arm, that is operatively connected with the stem to turn the same, is arranged to be detachably connected with the wheel when the stem has been threaded inwardly far enough to close the shut-off valve and open the relief valve, whereby to make the shifting of the stem plate easy, even in relatively large valves where movement of the stem plate without shutoff of incoming water and relief of pressure is practically impossible. A salient feature of the device of my invention is the provision of a slidable key and keyway connection between the radial arm and the stem so that the stem may be turned with the arm, a latch means being carried on the hand wheel for detachably connecting the wheel to the arm so that the wheel will turn with the stem when it is being turned by means of the arm.

The invention is illustrated in the accompanying drawings, in which—

Figure 1:
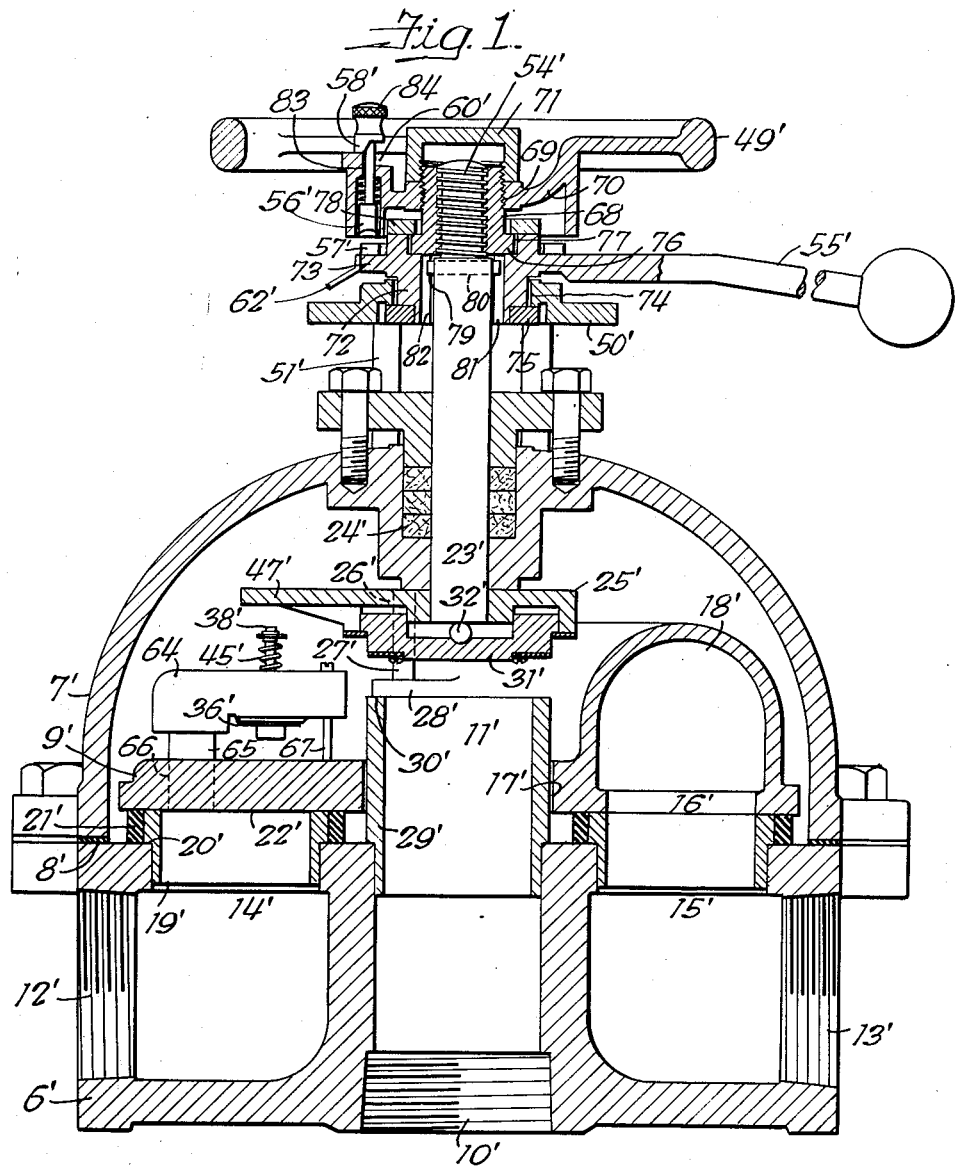
Figure 2:
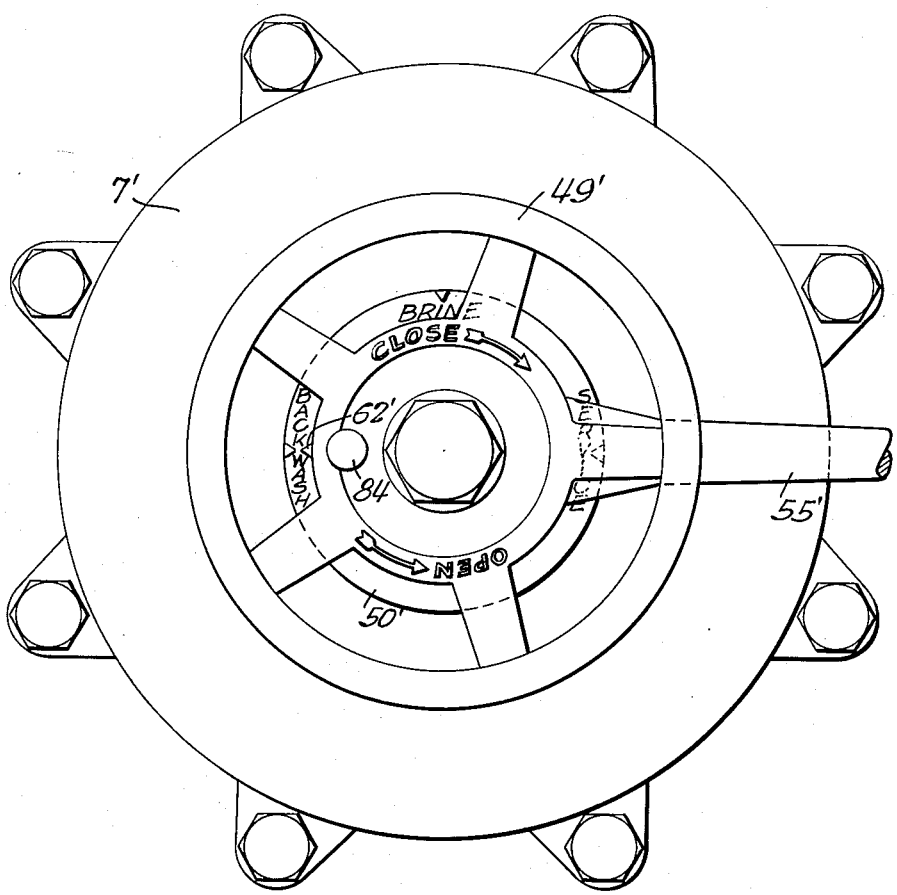

Fig. 1 is a vertical section through a multiport valve embodying valve operating means made in accordance with my invention and showing the valve in backwash position, and Fig. 2 is a plan view of Fig. 1.

The same reference numerals are applied to corresponding parts in the two views.

Referring to the drawings, the valve shown bears a general resemblance to that disclosed in McGill Patent 2,209,992, the reference numeral 6' designating the stator or body member of the valve on which a cap or cover 7' is suitably secured, compressing a gasket 8' therebetween to prevent leakage. The cover encloses the rotor or stem plate 9', and this stem plate in its three operative positions—service, backwash, and salt wash or brine—controls the flow of water through the valve by providing a different system of communication between the various ports in the body 6' in each of the three positions. It should be understood that although the valve is one especially designed for use in controlling the flow of fluids to and from a zeolite water softener, the invention is not limited to that or any other specific application but is applicable to valves generally.

The body 6' has a central axial threaded opening 10' in the bottom thereof for connection with the raw water supply pipe. The port 11' communicating with this opening will therefore be referred to as the pressure or inlet port. Four radial threaded openings, like those shown at 12' and 13', are provided in the body 90° apart in circumferentially spaced relation for connection to pipes that conduct fluid into and out of the valve. There are four equidistantly spaced main ports like those shown at 14' and 15' in the body 6' communicating with these openings opening to the flat top face of the body, all at the same radial distance from the center port 11'. Certain auxiliary ports communicate with certain of these main ports, as described in the McGill et al. Patent 2,398,437, issued April 16, 1946, one of these communicating with an ejector nozzle in the body 6' to siphon brine from a brine tank through a cored passage in the body 6', in the manner clearly disclosed in McCanna Patent 2,209,989. The stem plate 9' has three ports like that shown at 16' provided therein 90° apart adapted to register with three of the main ports in the body in different positions of the stem plate. There is also a central port 17' in the stem plate which registers with the port 11' in the body member in all positions of the stem plate, and a smaller port (not shown) in radially spaced relation to the center port arranged to register with one of the auxiliary ports in the body in the backwash position of the stem plate and with the other auxiliary port in the body in the salt wash or brine position of the stem plate. Two of the ports in the stem plate 9' are interconnected by a 90° cored passage 18'.

The operation of the valve is fully described in the McGill et al. Patent 2,398,437, issued April 16, 1946, but may be generally understood from Fig. 1 alone. In the normal softening operation, assuming the stem plate 9' is in the softening position, the incoming raw water from the pressure of supply port 11' flows into the cover 7' and the raw water leaves the valve through communicating ports in the stem plate 9' and body 6' and enters the top of the softener for passage downwardly through the bed of water softening material therein. The softened water leaving the bottom of the softener re-enters the valve through other communicating ports in the body and stem plate and flows through the passage 18' and out of the valve through communicating ports 16' and 14' to the service system. This flow continues until the water softener requires regeneration, whereupon the operator, as will later appear, shifts the stem plate 9' to the backwash position, which is the position shown in Fig. 1, 180° removed from the service position. During backwash, the incoming raw water from the pressure or supply port 11' flows through communicating ports in the stem plate and body out of the valve and into the bottom of the softener for passage upwardly through the bed of water softening material so as to break up the bed preparatory to the salt wash flow and also wash out from the top of the tank whatever sediment accumulated on the top of the bed during the softening operation. The water leaving the top of the softener re-enters the valve through other communicating ports in the body and stem plate and flows through the passage 18' and out of the valve through communicating ports 16' and 15' to the drain. This flow is continued for a predetermined time, sufficient to thoroughly cleanse the bed and prepare it for the salt wash. At the conclusion of the backwash flow, the operator, as will later appear, shifts the stem plate 9' to the salt wash or brine position which is 90° removed from the backwash position. During the salt wash, the incoming raw water is delivered through one of the auxiliary ports in the stem plate 9' to the ejector nozzle so that brine may be siphoned from the brine tank and discharged with the water into the top of the softener. The mixture of brine and water flowing downwardly through the bed of water softening material regenerates the same, and the spent brine and released calcium and magnesium is discharged from the bottom of the softener and re-enters the valve through communicating ports in the body and stem plate and is conducted through the passage 18' and out to the drain through port 15'. This salt wash flow continues until the level in the brine tank drops to a predetermined point, whereupon a valve in the brine pipe is closed so that no more brine will be used. After the brine valve has been closed, the raw water flow is continued downwardly through the softener and out to the drain until the water discharged to the drain tests soft, whereupon the operator, as will later appear, shifts the stem plate 9' back to the service position. When the valve is in the service position, the supply of water in the brine tank may be replenished by opening the brine valve again, raw water under those conditions being delivered to the brine tank through communicating ports in the stem plate and body and out through the pipe extending to the brine tank. When the water reaches the proper level in the brine tank, the brine valve is closed and, assuming there is sufficient salt present in the brine tank, a supply of brine will be on hand ready for the next regeneration.

The main ports in the body 6', as shown at 14' and 15', have rings 19' pressed therein and projecting upwardly from the body a uniform height, determined by annular shoulders 20' on the outside thereof engaging the top face of the body. These rings have rubber seal rings 21' surrounding the same and seated on the flat top face of the body with their upper ends projecting slightly beyond the ends of the rings 19' for sealing contact with the flat bottom face 22' of the stem plate 9'. The rings 21', therefore, perform the sealing function, while the rings 19' serve positively to limit compression of the rings 21', thus preventing damage thereto. With this arrangement there is no necessity for lifting the stem plate before it is turned from one position to another. The fact that the hydraulic pressure on the stem plate is relieved preliminary to the turning of the stem plate, as will soon appear, greatly reduces the drag which there would otherwise be of the stem plate on the gasket rings, and the stem plate can, therefore, be turned with less effort and with less likelihood of damage to the gasket rings.

The operating stem 23' for the stem plate 9' extends through a stuffing box 24' in the top of the cover 7' and has a secondary plate 25' suitably secured on the inner end thereof to turn or move endwise therewith. This secondary plate has holes 26' in circumferentially spaced relation, which receive with a free sliding fit pins 27' projecting upwardly from bosses 28' provided on the stem plate around its center port 17'. A tubular neck portion 29' is provided on top of the body 6' at the center thereof surrounding the central pressure or supply port 11', and the central port 17' in the stem plate is large enough to accommodate this neck portion freely. A seat 30' is formed on the upper end of the neck portion 29' for the shut-off valve 31' which is of circular disk form and universally rotatably mounted on the plate 25' for axial movement with the plate toward and away from the seat 30'. A bearing ball 32' seated in central recesses in the end of the stem 23' and top of the valve disk permits the valve 31' to adjust itself universally with respect to the stem 23' for uniform engagement with the seat 30'. The valve disk is suitably held in a circular recess in the bottom of the plate 25'. A compressible gasket ring held in place on the bottom face of the valve disk insures a water-tight seal when the shut-off valve 31' is closed. It should be clear that when the stem 23' holds the shut-off valve 31' closed the plate 25' may be turned with respect to the shut-off valve with the stem 23' to shift the stem plate 9' from one operating position to another. The parallel pins 27' maintain a sliding operating connection between the plate 25' and the stem plate 9' in all positions of adjustment of the stem 23'. The fact that the shut-off valve 31' is closed before the stem plate 9' is moved is of great advantage for two reasons; one being that it avoids the wasting of water, and the other being that it prevents objectionable water-hammer, otherwise common in the operation of valves of this general type. While it would be feasible in smaller sized valves to turn the stem plate without relief of the hydrostatic pressure after the shut-off valve 31' is closed, because as soon as the stem plate was shifted the hydrostatic pressure would be released to the drain 15', it is preferred to provide a separate pressure relief valve for that purpose, especially in larger sized valves where shifting of the stem plate prior to closing of the shut-off valve and opening of the relief valve is practically impossible.

The present valve, in accordance with the McGill et al. Patent 2,398,437, issued April 16, 1946, includes a pressure relief valve 36' mounted on the stem plate 9', which is arranged to be opened automatically when the shut-off valve 31' is closed, to place the inside of the cover 7' and all portions of the system communicating therewith at atmospheric pressure by establishing communication therefor with the drain port 15' in the body 6'. The relief of pressure in the cover 7' by the opening of valve 36' is important only when the stem plate 9' is in the service position, speaking with reference to a softener installation, of course, because in that position the cover 7' has no communication with the drain unless the relief valve 36' is opened. In the other positions of the stem plate 9' the cover 7' communicates through the softener with the drain, because in the backwash position the top of the softener is connected to the drain and the bottom of the softener to the interior of the cover; and in the brining and rinsing position the bottom of the softener is connected to the drain and the top of the softener to the interior of the cover. Hence, with the water pressure source cut off and the inside of the cover at atmospheric pressure, the stem plate 9' can be turned easily and wear and tear on the gasket rings 21' is reduced to a minimum, and there is furthermore no objectionable water hammer, and the other objections previously mentioned are eliminated. The pressure relief valve 36' in this valve, in accordance with the disclosure in my copending application, Serial No. 570,271, filed December 29, 1944, while arranged to open downwardly in the closing of the shut-off valve seats upwardly partly under spring pressure and partly under hydraulic pressure, so as to reduce likelihood of leakage of water to the drain. This valve 36' is normally urged upwardly to a closed position partly by the action of the coiled compression spring 45' that cooperates with the stem 38' of the valve and partly by water pressure, a flat seat being provided on the bottom of the fitting 64 for the pressure relief valve. A nipple 65 supports the fitting 64 in a port 66 in the stem plate. A screw 67 holds the fitting 64 against rotary displacement from a predetermined position around the nipple 65 as a center. The projection 47' on the plate 25' cooperates with the stem 38' to open the relief valve 36' at the same time that the shut-off valve 31' is closed. Pins 27' projecting upwardly from the stem plate and slidably received in holes 26' in the plate 25' provide a sliding operating connection between the stem 23' and the stem plate 9' in all positions of rotary and endwise adjustment of the stem 23'.

The hand wheel 49' raises and lowers the stem, and the arm 55' turns it. The endwise movement of the stem is obtained by turning the wheel 49', the upper end 54' of the stem being threaded in a nut 68 so as to move endwise when the wheel is turned. The nut 68 is externally threaded, as indicated at 69, to thread in the hub portion 70 of the hand wheel, a combination cap and lock nut 71 being threaded over the projecting end of the nut 68 and tightened against the top of the hub 70 to lock the parts, so that the nut 68 turns with the hand wheel 49' as a unit. An indexing plate 50', bearing legends "Service," "Brine," and "Backwash," is suitably secured to the cover 7' on spaced lugs 51' that are cast integral with the top of the cover and project upwardly therefrom. The arm 55' has a reduced cylindrical portion 72 of its hub 73 entered freely in a circular center hole 74 in the plate 50' for easy turning of the arm 55', a ring 75 being suitably secured to the projecting lower end of the reduced hub portion 72 to prevent withdrawal thereof from the hole 74. A pointer 62' on the hub 73 cooperates with the index plate 50' to indicate the position of rotary adjustment of the stem plate 9', the stem plate being illustrated in the backwash position in Fig. 1 and the pointer 62' being accordingly shown adjacent the "Backwash" mark on the index plate 50' in Fig. 2. The nut 68 has an enlarged cylindrical lower end portion 76 entered freely in a circular counterbore 77 in the hub 73 of the arm 55', whereby to permit turning of the hand wheel 49' freely with respect to the arm 55', a ring 78 being suitably secured to the top of the hub 73 to retain the nut 68 against upward displacement from the counterbore. A pin 79 has a close fit in a diametrically extending hole 80 in the upper end portion of the stem 23', and has its projecting ends slidable freely in vertical keyways 81 provided in the diametrically opposite sides of the bore 82 in the hub portion 73 of the arm 55', whereby to maintain a driving connection between the arm 55' and the stem 23' in any position of up and down adjustment of the stem 23' within the limits of screw thread adjustment of said stem by means of the hand wheel 49' and nut 68 operated thereby. Thus the pin 79 is shown at the upper extreme position in Fig. 1, the shut-off valve 31' being shown in the raised open position. In the closed position of the shut-off valve 31', the pin 79 is in the lower end of the keyways 81.

The hub 73 has ratchet teeth 57' provided annularly on the top thereof to cooperate with a spring pressed latch 56' mounted in a vertical hole 83 in the hub portion 70 of the hand wheel 49'. The operating knob 84 on the upper end of the stem of the latch 56' has a downward projection 58' on one-half thereof, which is accommodated in a recess 60' in the hub when the knob is turned through 180° from the position illustrated in Fig. 1, and under those conditions the latch 56' cooperates with the ratchet teeth 57' to lock the hand wheel in fixed relation to the arm 55'. The latch 56' is shown in Fig. 1 in a retracted position. Under those conditions, the hand wheel 49' is free to turn in either direction relative to the arm 55'. In the operative position of the latch 56', the hand wheel 49' is positively connected to the arm 55' so that the wheel and arm turn as a unit when the stem plate is turned with the arm in a clockwise direction.

It is believed the foregoing description conveys a good understanding of the objects and advantages of my invention. The appended claims have been drawn to cover all legitimate modifications and adaptations.

I claim:

1. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, and means for detachably connecting said lever and nut elements, comprising a pawl on one of said elements engaging a ratchet on the other of said elements permitting turning of the nut in one direction only relative to said lever to move the stem endwise in one direction.

2. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, and means for detachably connecting said lever and nut elements, comprising a pawl on one of said elements engaging a ratchet on the other of said elements permitting turning of the nut in one direction only relative to said lever to move the stem endwise in one direction, said pawl being movable to an out-of-the-way inoperative position permitting free turning of the nut in either direction.

3. In a valve operating mechanism the combination with a stem adapted to be reciprocated and rotated, an index plate, a lever element swivelled relative to said plate and having a slidable operating connection with said stem permitting endwise movement of said stem relative thereto, a nut element swivelled but held against axial movement relative to said lever element and threadedly connected with said stem to transmit reciprocatory movement thereto, and means for detachably connecting said lever and nut elements comprising a pawl on one of said elements engaging a ratchet on the other of said elements permitting turning of the nut in one direction only relative to said lever to move the stem endwise in one direction.

4. In a valve operating mechanism the combination with a stem adapted to be reciprocated and rotated, an index plate, a lever element swivelled relative to said plate and having a slidable operating connection with said stem permitting endwise movement of said stem relative thereto, a nut element swivelled but held against axial movement relative to said lever element and threadedly connected with said stem to transmit reciprocatory movement thereto, and means for detachably connecting said lever and nut elements comprising a pawl on one of said elements engaging a ratchet on the other of said elements permitting turning of the nut in one direction only relative to said lever to move the stem endwise in one direction, said pawl being movable to an out-of-the-way inoperative position permitting free turning of the nut in either direction.

5. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, and a spring pressed pawl carried on said nut element normally urged toward engagement with ratchet teeth on said lever element to lock said elements against relative rotation in one direction, whereby to permit turning said stem in one direction when said pawl and ratchet are engaged.

6. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, and a spring pressed pawl carried on said nut element normally urged toward engagement with ratchet teeth on said lever element to lock said elements against relative rotation in one direction, whereby to permit turning said stem in one direction when said pawl and ratchet are engaged, and means for releasably locking said pawl in a retracted inoperative position to permit turning said nut relative to said lever in either direction.

7. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and means for detachably connecting said lever and nut elements, comprising a pawl on one of said elements engaging a ratchet on the other of said elements permitting turning of the nut in one direction only relative to said lever to move the stem endwise in one direction.

8. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and means for detachably connecting said lever and nut elements, comprising a pawl on one of said elements engaging a ratchet on the other of said elements permitting turning of the nut in one direction only relative to said lever to move the stem endwise in one direction, said pawl being movable to an out-of-the-way inoperative position permitting free turning of the nut in either direction.

9. In a valve operating mechanism the combination with a stem adapted to be reciprocated and rotated, an index plate, a lever element swivelled relative to said plate and having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and means for detachably connecting said lever and nut elements comprising a pawl on one of said elements engaging a ratchet on the other of said elements permitting turning of the nut in one direction only relative to said lever to move the stem endwise in one direction.

10. In a valve operating mechanism the combination with a stem adapted to be reciprocated and rotated, an index plate, a lever element swivelled relative to said plate and having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and means for detachably connecting said lever and nut elements comprising a pawl on one of said elements engaging a ratchet on the other of said elements permitting turning of the nut in one direction only relative to said lever to move the stem endwise in one direction, said pawl being movable to an out-of-the-way inoperative position permitting free turning of the nut in either direction.

11. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and a spring pressed pawl carried on said nut element normally urged toward engagement with ratchet teeth on said lever element to lock said elements against relative rotation in one direction, whereby to permit turning said stem in one direction when said pawl and ratchet are engaged.

12. In a valve operating mechanism the combination with a stem adapted to be reciprocated and rotated, a lever element having a slidable operating connection with said stem permitting endwise movement of said stem relative thereto, a nut element swivelled but held against axial movement relative to said lever element and threadedly connected with said stem to transmit reciprocatory movement thereto, a hand wheel rigidly secured to the nut to turn the same relative to and independently of said lever element, and a spring pressed pawl carried on said nut element normally urged toward engagement with ratchet teeth on said lever element to lock said elements against relative rotation in one direction, whereby to permit turning said stem in one direction when said pawl and ratchet are engaged, and means for releasably locking said pawl in a retracted inoperative position to permit turning said nut relative to said lever in either direction.

13. In a valve operating mechanism, the combination with a stem adapted to be reciprocated and rotated, a nut element threadedly connected with said stem to transmit reciprocatory movement thereto, a manually rotatable element slidably but non-rotatably connected to said stem to turn the same while permitting axial movement of said stem relative thereto, means rotatably mounting the manually rotatable element, means rotatably mounting the nut element so that it is held against axial movement relative to the manually rotatable element, a second manually rotatable element fixed to said nut to turn it, and means for detachably connecting said first mentioned and second mentioned manually rotatable elements comprising a pawl on one of said elements engaging a ratchet on the other of said elements.

14. In a valve operating mechanism, the combination with a stem adapted to be reciprocated and rotated, a nut element threadedly connected with said stem to transmit reciprocatory movement thereto, a manually rotatable element slidably but non-rotatably connected to said stem to turn the same while permitting axial movement of said stem relative thereto, means rotatably mounting the manually rotatable element, means rotatably mounting the nut element so that it is held against axial movement relative to the manually rotatable element, a second manually rotatable element fixed to said nut to turn it, and means for detachably connecting said first mentioned and second mentioned manually rotatable elements comprising a pawl on one of said elements engaging a ratchet on the other of said elements, said pawl being retractable to an inoperative position permitting free turning of the nut in either direction by means of said second mentioned manually rotatable element.

HARRY MANSEN.

REFERENCES CITED

The following references are of record in the file of this patent:

UNITED STATES PATENTS

| Number | Name | Date |
|---|---|---|
| 933,290 | Clay | Sept. 7, 1909 |
| 1,018,591 | Sperry | Feb. 27, 1912 |
| 1,669,844 | Sparks | May 15, 1928 |
| 2,093,692 | Daniel | Sept. 21, 1937 |
| 2,315,058 | Holt | Mar. 30, 1943 |
| 2,428,410 | Daniels | Oct. 7, 1947 |

FOREIGN PATENTS

| Number | Country | Date |
|---|---|---|
| 352,228 | Great Britain | July 9, 1931 |